(12) United States Patent
Fukuda et al.

(10) Patent No.: US 9,332,691 B2
(45) Date of Patent: May 10, 2016

(54) AUTONOMOUS TRAVEL WORK SYSTEM

(71) Applicants: Toshio Fukuda, Nagoya-shi, Aichi (JP); Kosuke Sekiyama, Nagoya-shi, Aichi (JP); YANMAR CO., LTD., Osaka-shi, Osaka (JP)

(72) Inventors: Toshio Fukuda, Nagoya (JP); Kosuke Sekiyama, Nagoya (JP); Keiji Matsumoto, Osaka (JP); Jun Terashima, Osaka (JP)

(73) Assignee: YANMAR CO., LTD., Osaka-Shi (JP)

( * ) Notice: Subject to any disclaimer, the term of this patent is extended or adjusted under 35 U.S.C. 154(b) by 0 days.

(21) Appl. No.: 14/646,669

(22) PCT Filed: Nov. 29, 2013

(86) PCT No.: PCT/JP2013/082138
§ 371 (c)(1),
(2) Date: May 21, 2015

(87) PCT Pub. No.: WO2014/084332
PCT Pub. Date: Jun. 5, 2014

(65) Prior Publication Data
US 2015/0296707 A1 Oct. 22, 2015

(30) Foreign Application Priority Data

Nov. 29, 2012 (JP) ................... 2012-260897

(51) Int. Cl.
*A01D 34/00* (2006.01)
*G05D 1/02* (2006.01)
*A01B 69/04* (2006.01)
(Continued)

(52) U.S. Cl.
CPC .............. *A01D 34/008* (2013.01); *A01B 69/00* (2013.01); *A01B 69/008* (2013.01); *A01D 34/64* (2013.01); *G05D 1/00* (2013.01); *G05D 1/02* (2013.01); *G05D 1/0274* (2013.01); *G05D 1/0278* (2013.01); *G06F 3/04845* (2013.01); *G06F 3/04847* (2013.01); *G06Q 10/0631* (2013.01); *G06Q 30/0283* (2013.01); *G05D 2201/0208* (2013.01)

(58) Field of Classification Search
None
See application file for complete search history.

(56) References Cited

U.S. PATENT DOCUMENTS 5,540,516 A 7/1996 Nicodemo et al.
5,681,129 A 10/1997 Nicodemo et al.
2012/0158236 A1 6/2012 Chung et al.

FOREIGN PATENT DOCUMENTS

JP 7-152336 A 6/1995
JP 8-256522 A 10/1996
(Continued)

*Primary Examiner* — Thomas Tarcza
*Assistant Examiner* — Garrett Evans
(74) *Attorney, Agent, or Firm* — Birch, Stewart, Kolasch & Birch, LLP

(57) ABSTRACT

An autonomous travel work system works, regarding a garden LD as a canvas and applying an arbitrary design to the garden LD, according the design. The autonomous travel work system includes an information terminal configured to be input means and transmit input information, a computer configured to receive the input information, and at least one electric lawn mower configured to work autonomously traveling in the garden LD. The information terminal includes a display, a work ground input, a design allocation input, and a work request device. The information terminal or the computer includes a work ground designation device, a design allocation device, a mapping route generator, and a work pattern generator.

20 Claims, 19 Drawing Sheets

(51) Int. Cl.
*A01B 69/00* (2006.01)
*A01D 34/64* (2006.01)
*G05D 1/00* (2006.01)
*G06F 3/0484* (2013.01)
*G06Q 10/06* (2012.01)
*G06Q 30/02* (2012.01)

(56) References Cited

FOREIGN PATENT DOCUMENTS

| | | | |
|---|---|---|---|
| JP | 3454666 | B2 | 10/2003 |
| JP | 2009-106199 | A | 5/2009 |
| JP | 2012-105557 | A | 6/2012 |

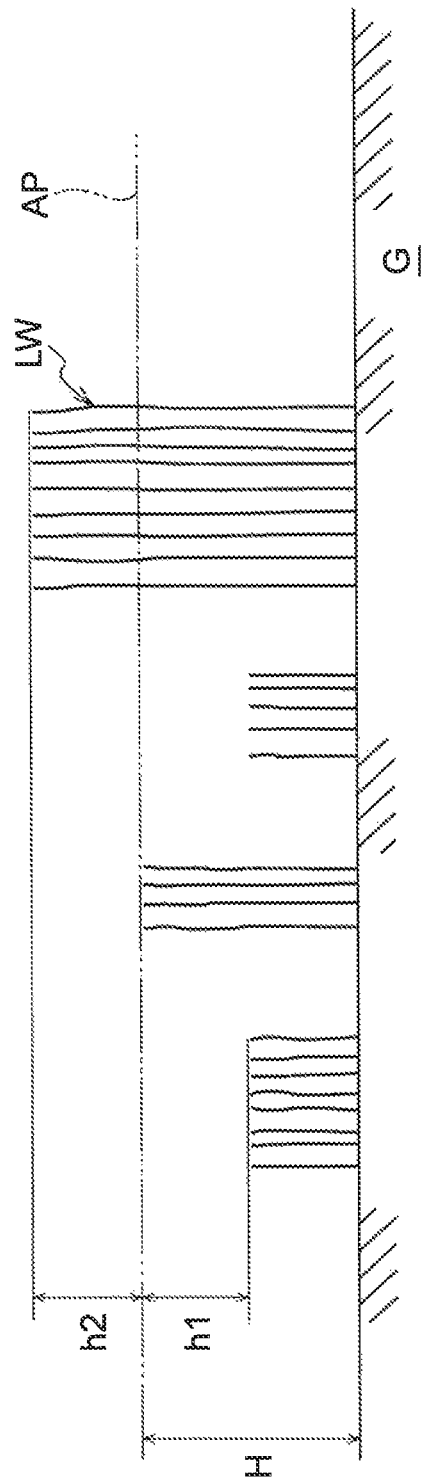

AUTONOMOUS TRAVEL WORK SYSTEM

TECHNICAL FIELD

The present invention relates to an autonomous travel work system which works, regarding a work ground as a canvas and applying an arbitrary design to the work ground, according to the design.

BACKGROUND ART

Patent Literature 1 discloses an example of an autonomous travel work system using an electric lawn mower which autonomously travels using a GPS radio wave signal from a GPS satellite. The literature discloses a system which can mow a lawn autonomously traveling by performing radio communication between a base station and an electric lawn mower.

CITATION LIST

Patent Literature

Patent Literature 1: JP 2012-105557 A

SUMMARY OF INVENTION

Technical Problem

When a lawn in a relatively large garden is mowed, there is a request to draw a design, such as an image and a letter, regarding the lawn as a canvas. In this case, it is required to mow the lawn after applying the design, such as an image and a letter, to a shape of the garden. However, a method for applying a design, such as an image and a letter, to a garden, and a system, in which a system user requests to mow a lawn according to the design, and the execution and the management of the requested lawn mowing are performed, has not been constructed. Therefore, the invention provides an autonomous travel work system which works, regarding a work ground as a canvas and applying an arbitrary design to the work ground, according to the design.

Solution to Problem

Therefore, the invention described in claim 1 is an autonomous travel work system which works, regarding a work ground as a canvas and applying an arbitrary design to the work ground, according to the design, the system including:
  an information terminal configured to be input means and transmit input information;
  a computer configured to receive the input information; and
  at least one work vehicle configured to work autonomously traveling in the work ground, wherein
  the information terminal includes:
    display means for displaying a map image including the work ground;
    work ground input means for inputting the work ground on the map image displayed on the display unit;
    design allocation input means for inputting the arbitrary design to be allocated to the work ground; and
  work request means for requesting a work,
    the information terminal or the computer includes:
    work ground designation means for generating location information about the work ground based on the work ground input on the map image;
    design allocation means for allocating the input design to the work ground and generating location information about the design and contrast information about the design; and
    work information generation means for generating geographical information about the work ground designated on the map image and the input design as work information.

The invention described in claim 2 is, in the autonomous travel work system according to claim 1, the information terminal includes design generation means for creating the design.

The invention described in claim 3 is, in the autonomous travel work system according to claim 1 or 2, the information terminal or the computer includes the work fee calculation means for calculating a work fee estimation based on the work information,
  the information terminal includes desired date/time input means for inputting a desired date and time for the work, and
  the computer includes schedule management means for managing a schedule of the work based on the desired date and time.

The invention described in claim 4 is, in the autonomous travel work system according to any of claims 1 to 3, the design allocation means sets the design based on constraint conditions on that the work vehicle is able to work.

The invention described in claim 5 is, in the autonomous travel work system according to any of claims 1 to 4, the information terminal or the computer includes design extracting means for extracting a recommended design suitable for a shape of the work ground from existing designs.

The invention described in claim 6 is, in the autonomous travel work system according to any of claims 1 to 5, the information terminal or the computer includes storage means for storing the work information, and
  the work request means included in the information terminal requests the work based on the work information.

The invention described in claim 7 is, in the autonomous travel work system according to any of claims 1 to 6, the work request means performs settlement of the work fee when the work is requested.

The invention described in claim 8 is, in the autonomous travel work system according to any of claims 1 to 7, the computer is movable.

The invention described in claim 9 is, in the autonomous travel work system according to any of claims 1 to 8, the work is a grass mowing work.

The invention described in claim 10 is, in the autonomous travel work system according to any of claims 1 to 9, the work vehicle electrically travels and works.

Advantageous Effects of Invention

According to the invention described in claim 1, an autonomous travel work system works, regarding a work ground as a canvas and applying an arbitrary design to the work ground, according to the design. The autonomous travel work system includes an information terminal configured to be input means and transmit input information, a computer configured to receive the input information, and at least one work vehicle configured to work autonomously traveling in the work ground. The information terminal includes display means for displaying a map image including the work ground, work ground input means for inputting the work ground on the map image displayed on the display unit, design allocation input means for inputting an arbitrary design to be allocated to the work ground, and work request means for requesting the work. The information terminal or the computer includes work ground designation means for generating location information about the work ground based on the work ground input on the map image, design allocation means for allocating the input design to the work ground and generating location information about the design and contrast information about the design, and work information generation means for generating geographical information about the work ground designated on the map image and work information about the input design.

Therefore, there can be provided an autonomous travel work system which can work, regarding a work ground as a canvas and applying an arbitrary design to the work ground, according to the design. Furthermore, a system user can easily request a work. For example, when a lawn in a relatively large garden is mowed, it is thereby possible to draw a design, such as an image and a letter, regarding the lawn as a canvas with an easy request method.

According to the invention described in claim 2, the information terminal includes design creation means for creating the design. Therefore, the system user can arbitrarily create a desired design.

According to the invention described in claim 3, the information terminal or the computer includes work fee calculation means for calculating a work fee estimation based on the work information. The information terminal includes desired date/time input means for inputting a desired date and time for the work, and the computer includes schedule management means for managing a schedule of the work based on the desired date and time. Therefore, the system user can review or change the work contents and decide whether the user requests the work or not based on the work fee estimation. The work can be performed on the system user's desired date and time, and the work schedule can be managed.

According to the invention described in claim 4, the design allocation means sets the design based on constraint conditions on that the work vehicle is able to work. Therefore, when the system user creates a design, the user is not required to confirm whether the work vehicle can work based on the design or not. Since the design based on which the work vehicle can work is set, the system user can grasp how the work is performed based on the created design before requesting the work. The system user can thereby easily request the work.

According to the invention described in claim 5, the information terminal or the computer includes design extraction means for extracting a recommended design suitable for a shape of the work ground from existing designs. Therefore, the means assists the system user in creating a design and it is possible to reduce the system user's labor for creating a design.

According to the invention described in claim 6, the information terminal or the computer includes storage means for storing the work information, and the work request means included in the information terminal requests the work based on the work information. Once the work information is generated, the information does not need to be regenerated, and it is possible to reduce the system user's labor for requesting the work. The system user can thereby easily request the work.

According to the invention described in claim 7, when the work is requested, the work request means performs settlement of the work fee. Therefore, the system user and the system provider can easily perform the settlement.

According to the invention described in claim 8, the computer is movable. Therefore, by placing the computer near the work ground, monitoring the movement of the work vehicle with the computer, the actual movement of the work vehicle can be visually observed. More reliable work can be thereby performed.

According to the invention described in claim 9, the work is a grass mowing work. Therefore, lawn mowing can be performed according to an arbitrary design on a lawn in a golf course, a large garden, and the like.

According to the invention described in claim 10, the work vehicle electrically travels and works. Therefore, exhaust gas is not emitted unlike an engine driven vehicle, and it is beneficial to prevent atmospheric pollution and global warming.

BRIEF DESCRIPTION OF DRAWINGS

FIG. 19 is a diagram to illustrate the height of the mowed lawn.

DESCRIPTION OF EMBODIMENTS

Figure 1:
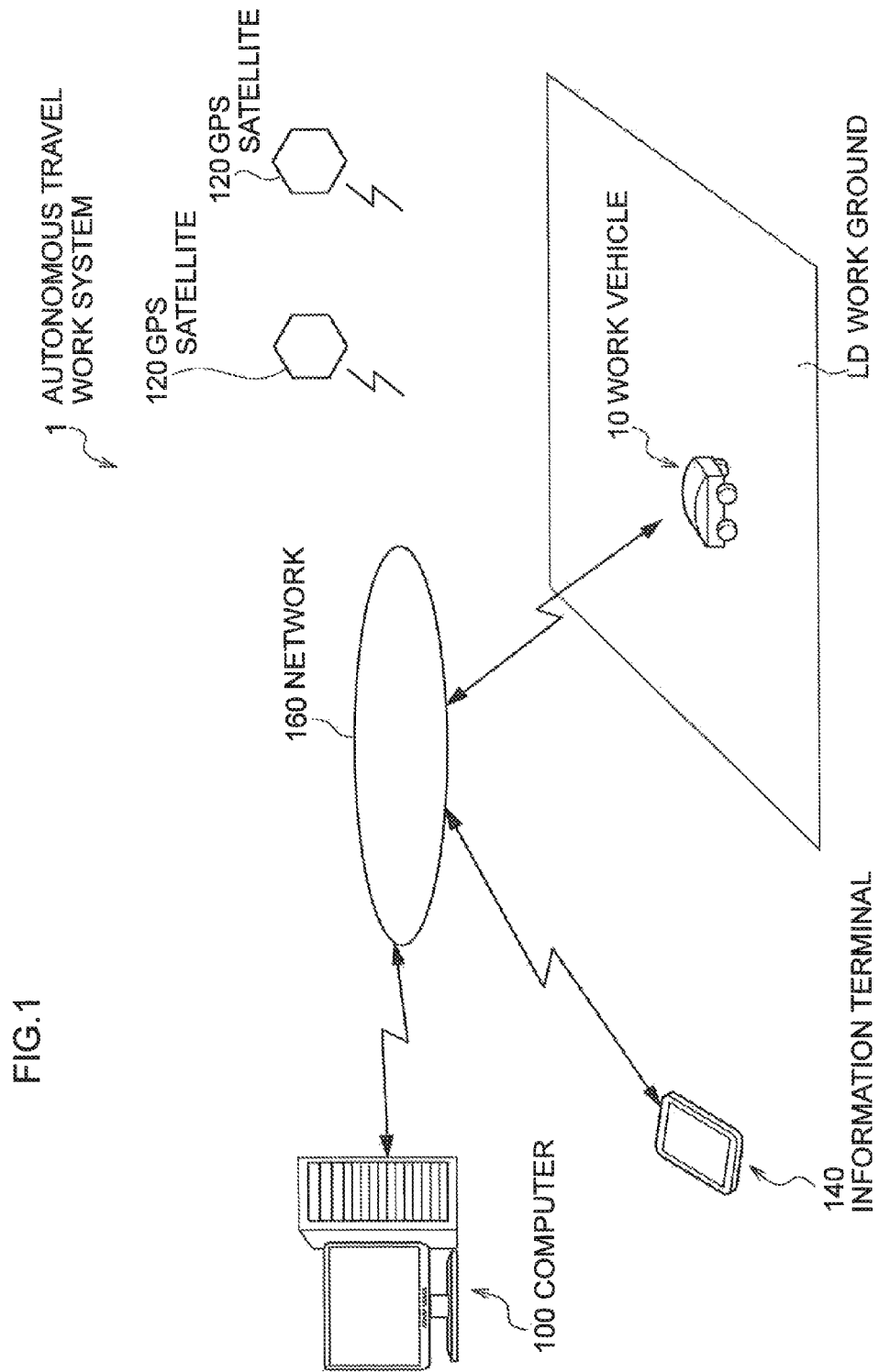
FIG. 1 is a diagram to illustrate an example of an autonomous travel work system of the invention.

Hereinafter, the embodiments of the invention will be described with reference to the drawings. FIG. 1 shows a schematic diagram of an autonomous travel work system as an example of the invention. An autonomous travel work system 1 draws an arbitrary design, such as an image and a letter, mowing a lawn in a garden (work ground) LD which is large to some extent or more. The autonomous travel work system 1 includes, in addition to an electric lawn mower (autonomous travel work vehicle) 10, a computer 100, a plurality of GPS satellites 120, and an information terminal 140.

The electric lawn mower 10, the computer 100, and the information terminal 140 are connected to each other through a network 160.

Although it is not shown in the drawings, the autonomous travel work system 1 may include an operation terminal which can remotely operate the electric lawn mower 10. The operation terminal may be, for example, a gyro stick which can control a traveling direction and traveling speed of the electric lawn mower 10 by moving the stick right-and-left and back-and-forth, or a device having a button two-dimensionally displayed as an image on a display unit and operated by touching the button with a tough sensor. Furthermore, although it is not shown in the drawings, the autonomous travel work system 1 may include a server which connects to the computer 100 through a network. Various types of data stored in the computer 100 may be stored in the server and the necessary data may be read from the server.

Figure 2:
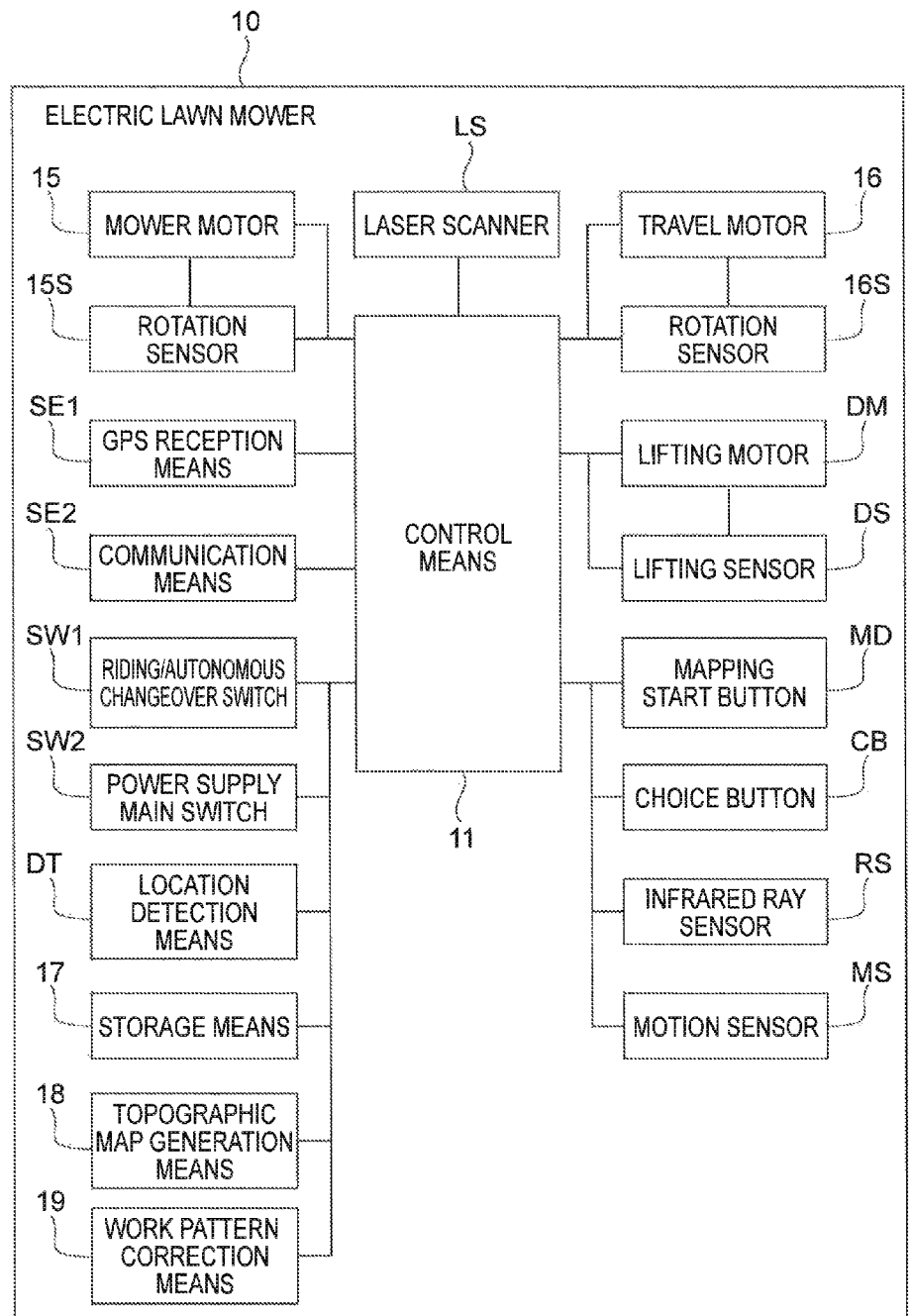
FIG. 2 is a block diagram showing a configuration of an electric lawn mower as a constituent element of it.

As shown in FIG. 2, the electric lawn mower 10 includes a mower blade, mower motors 15 (a pair of right and left motors), a rotation sensor 15S, a travel motor 16 (disposed on both of the right and left wheels), a rotation sensor 16S, a GPS reception means SE1, a location detection means DT, and a communication means SE2. The mower blade mows a lawn by rotating. The mower motor 15 rotates the mower blade. The rotation sensor 15S measures the rotation direction and the rotation number of the mower motor 15. The travel motor 16 drives a travel tire of the electric lawn mower 10. The rotation sensor 16S measures the rotation direction and the rotation number of the travel motor 16. The GPS reception means SE1 receives a GPS wave signal from the GPS satellite 120. The location detection means DT determines the geographical location of the electric lawn mower 10 based on the GPS wave signal received by the GPS reception means SE1. The communication means SE2 communicates between the electric lawn mower 10 and the computer 100. Furthermore, the electric lawn mower 10 includes a riding/autonomous changeover switch SW1, a main switch button SW2, a mapping start button MB, a choice button CB, a storage means 17, a topographic map generation means 18, and a work pattern correction means 19. The riding/autonomous changeover switch SW1 changes the electric lawn mower 10 to be operated when being ridden or when autonomous traveling. The main switch button SW2 turns ON/OFF of a main power supply of the electric lawn mower 10. The mapping start button MB performs a mapping by autonomously traveling of the electric lawn mower 10. The topographic map generation means 18 generates a topographic map by the mapping.

In addition, the electric lawn mower 10 includes a lifting motor DM, a lifting sensor DS, and a motion sensor MS. The lifting motor DM automatically lifts a mower deck (disposed to cover the pair of mower blades) up and down. The lifting sensor DS coupled to the lifting motor DM detects the lifted height. The motion sensor MS measures the three-dimensional inclination of the electric lawn mower 10 with respect to the horizontal surface.

The communication means SE2 receives a work pattern (described later) and a map data from the computer 100, and transmits movement information of the electric lawn mower 10 to the computer 100. The movement information includes the rotation number and the rotation direction of the mower motor 15 measured by the rotation sensor 15S, the rotation number and the rotation direction of the travel motor 16 measured by the rotation sensor 16S, the height of the mower deck measured by the lifting sensor DS, and the three-dimensional inclination angle of the electric lawn mower 10 with respect to the horizontal surface measured by the motion sensor MS.

Furthermore, the electric lawn mower 10 includes the work pattern correction means 19 which corrects the work pattern received from the computer 100 based on the map information received from the computer 100 and the topographic map information generated by mapping. The electric lawn mower 10 may include a camera to capture a surrounding situation, although it is not shown in the drawings.

The above described mower motor 15, rotation sensor 15S, travel motor 16, rotation sensor 16S, GPS reception means SE1, communication means SE2, location detection unit DT, riding/autonomous changeover switch SW1, main switch button SW2, mapping start button MB, choice button CB, storage means 17, topographic map generation means 18, lifting motor DM, lifting sensor DS, motion sensor MS, and work pattern correction means 19 are connected to a control means 11 and operated under the control of the control means 11.

Figure 3:
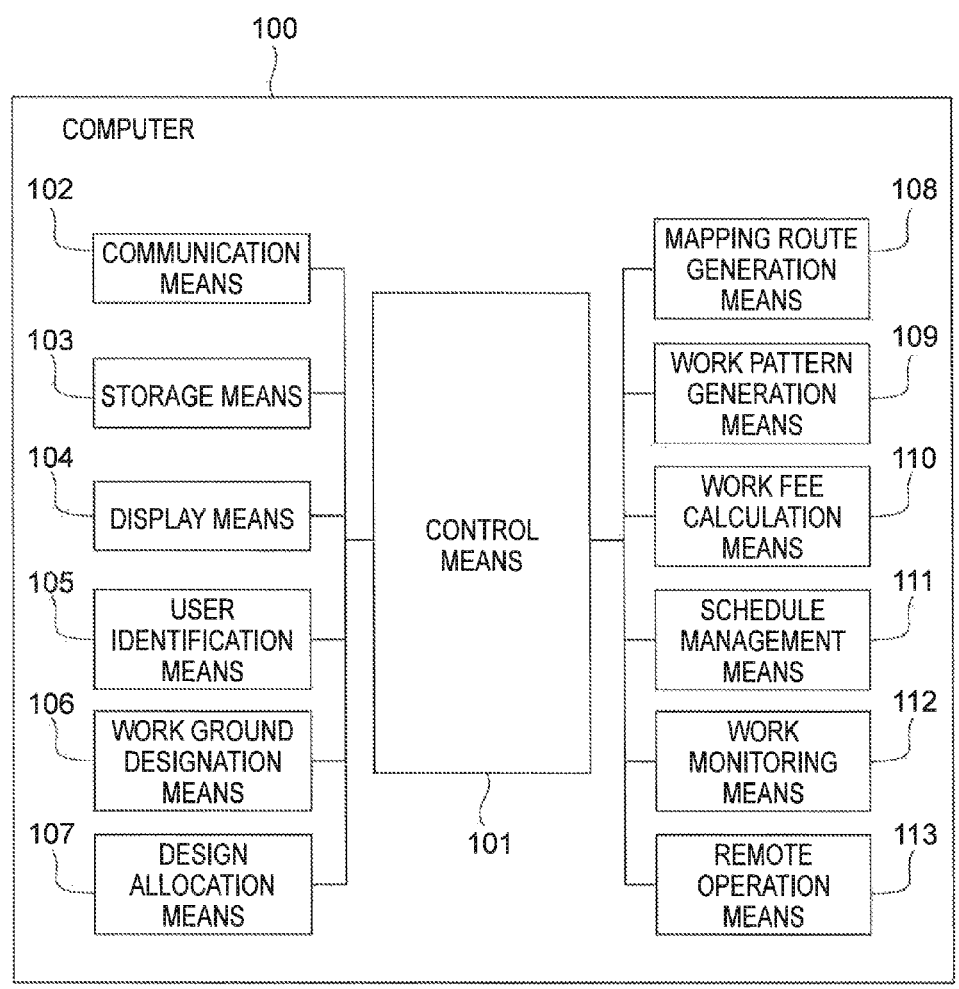
FIG. 3 is a block diagram showing a configuration of a computer as a constituent element of it.

As shown in FIG. 3, the computer 100 includes a control means 101, a communication means 102, a storage means 103, a display means 104, a user identification means 105, a work ground designation means 106, a design allocation means 107, a mapping route generation means 108, a work pattern generation means 109, a work fee calculation means 110, a schedule management means 111, a work monitoring means 112, and a remote operation means 113. The computer 100 may be movable.

The communication means 102 receives the movement information from the electric lawn mower 10 and transmits the work pattern to the electric lawn mower 10. In addition, the communication means 102 communicates with the information terminal 140.

The storage means 103 stores the map information having the location information including the garden LD, a plurality of design images, user information, and work information, which will be described later.

The user identification means 105 identifies the user based on the user information, for example, by preparing a user ID and a password for each user, identifies the user with the user ID and the password.

The work ground designation means 106 generates, based on the map information having the location information including the garden LD and an input border of the work ground, the location information on the border.

The design allocation means 107 generates, based on the map information having the location information including the garden LD and an input design image, the location information about a diagram of the design and contrast information about the diagram on the location.

The mapping route generation means (work information generation means) 108 generates a travel route of the electric lawn mower 10 when the mapping is performed, which will be described later.

The work pattern generation means (work information generation means) 109 calculates, based on the work ground and the design transmitted from the information terminal 140, the work pattern (the movement route, the location for mowing the lawn, and the height of the mowed lawn) of the electric lawn mower 10 (the detail will be described later).

The work fee calculation means 110 calculates a work fee estimation based on the work information.

The schedule management means 111 determines whether the lawn mowing can be implemented according to a user's desired date and time, and schedules the lawn mowing.

The work monitoring means 112 monitors movement conditions of the electric lawn mower 10 during the autonomous traveling by displaying, on the display means 104, for example, the current location, the traveling direction, the traveling speed, the traveling direction, the height of the mower deck, and the rotation speed of the mower blade of the electric lawn mower 10.

The remote operation means 113 performs a remote operation. The remote operation means 113 can perform various operations (moving forward, moving backward, suspending, turning, lifting the mower deck, and rotating and suspending the mower blade) to the electric lawn mower 10, and includes an emergency stop button to stop the movement of the electric lawn mower 10 in an emergency.

The communication means 102, the storage means 103, the display means 104, the user identification means 105, the work ground designation means 106, the design allocation means 107, the mapping route generation means 108, the work pattern generation means 109, the work fee calculation means 110, the schedule management means 111, the work monitoring means 112, the remote operation means 113 are connected to the control means 101 and operated under the control of the control means 101.

The GPS satellite 120 transmits the GPS wave signal.

The information terminal 140 is operated by the user (customer) of the autonomous travel work system 1 and communicates with the computer 100. Although a device capable of being continuously carried with the system user, is preferred for the information terminal 140, the information terminal 140 may be a terminal capable of connecting with the computer 100 through the network 160, and may also be a mobile computer, a desktop computer, or the like.

Figure 4:
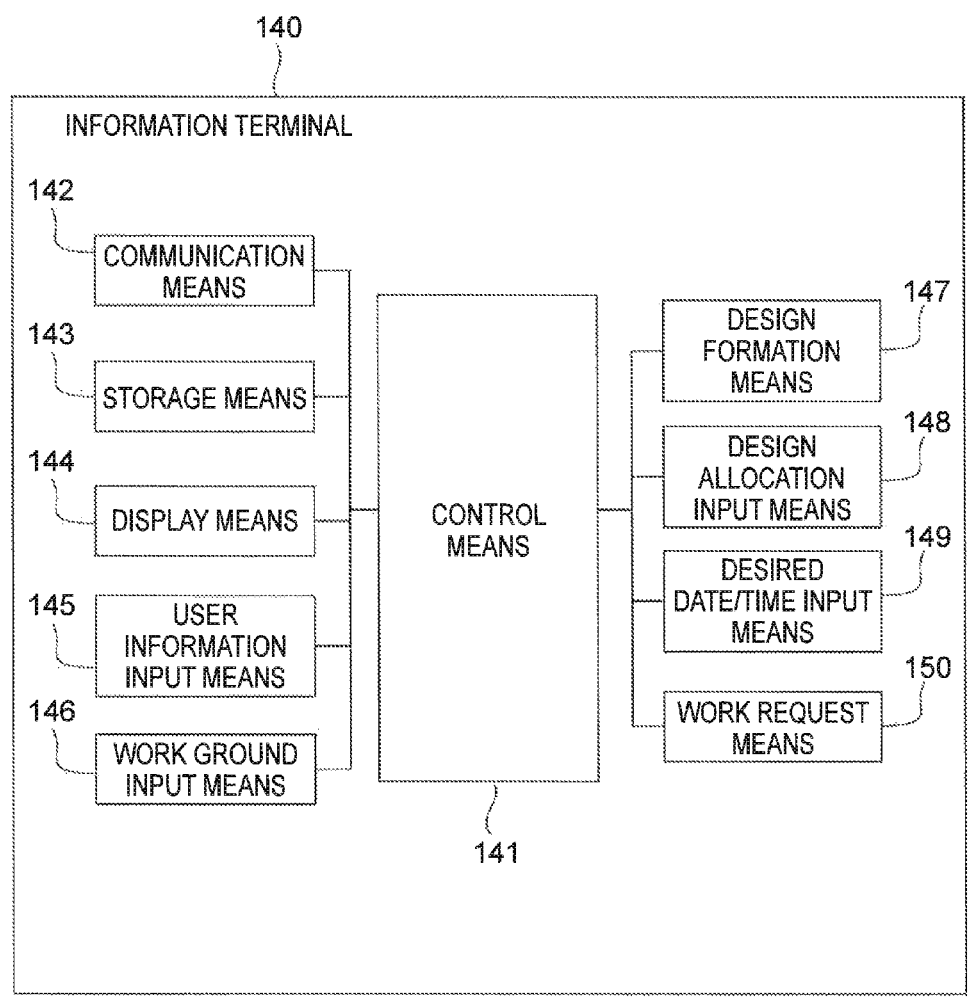
FIG. 4 is a block diagram showing a configuration of an information terminal as a constituent element of it.

As shown in FIG. 4, the information terminal 140 includes a control means 141, a communication means 142, a storage means 143, a display means 144, a user information input means 145, a work ground input means 146, a design formation means 147, a design allocation input means 148, a desired date/time input means 149, and a work request means 150.

The communication means 142 communicates with the computer 100.

The display means 144 displays image data to input the necessary information for requesting the work, for example, displays an image (e.g., an aerial photograph image) of the map information having the location information including the garden LD, and a design image to be drawn on the garden LD.

The user information input means 145 inputs a user name, the user's address, a credit card number and the expiration date thereof used for settlement by the user.

The work ground input means 146 inputs the border designating the area of the garden LD as the work ground. For example, the display means 144 has input means with a touch sensor, the map image (e.g., an aerial photograph image) having the location information including the garden LD is displayed on the display means 144, and the user arbitrarily draws the border designating the area of the garden LD as a work ground on the map image with reference to the map image on the display means 144 (the border generated by the work ground input means 146 is displayed on the display means 144 in real time). The border designating the area of the garden LD as the work ground may be drawn by other known drawing method. Alternatively, when the location information about the border of the work ground generated in advance by the computer 100 is stored in the storage means 103, the work ground may be input by selecting the location information.

The design formation means 147 generates a drawing which is arbitrarily drawn by the user on the display means 144 using the input means included in the display means 144 with a touch sensor (the drawing generated by the design formation means 147 is displayed on the display means 144 in real time). The drawing may be generated by other known drawing method.

The design allocation input means 148 inputs the design to be allocated to the garden LD as the work ground. For example, when the design image is stored in the storage means 103 of the computer 100 in advance, by selecting the design image, the design image is allocated to the garden LD as the work ground, and the design allocated to the garden LD is displayed on the display means 144.

The desired date/time input means 149 inputs the date and time on which the user desires to perform the lawn mowing as the work.

With the work request means 150, the user conclusively requests the work. When the work is requested, the settlement may be performed with user's credit card which has been input beforehand, or after the confirmation of the settlement to be performed with user's input credit card and inputting the user's decision of the settlement, the settlement procedure may be performed by a credit company.

The control means 141, the communication means 142, the storage means 143, the display means 144, the user information input means 145, the work ground input means 146, the design formation means 147, the design allocation input means 148, the desired date/time input means 149, and the work request means 150 are connected to the control means 141 and operated under the control of the control means 141.

The information input or selected by the information terminal 140 is appropriately transmitted to the computer 100 through the network 160 and used by each of the means of the computer 100 or stored in the storage means 103.

The information terminal 140 may include remote operation means capable of performing a remote operation to the electric lawn mower 10. remote operation means can perform various operations (moving forward, moving backward, suspending, turning, lifting the mower deck, and rotating and suspending the mower blade) to the electric lawn mower 10 and includes an emergency stop button to stop the movement of the electric lawn mower 10 in an emergency.

A network which enable the electric lawn mower 10 to communicate with the computer 100 and the computer 100 to communicate with the information terminal 140 may be applicable to the network 160. The network is, for example, a telephone communication network or an internet. A network 160 connecting the electric lawn mower 10 to the computer 100 may be different from a network 160 connecting the computer 100 to the information terminal 140.

Next, using the autonomous travel work system 1 with this configuration, an example of a work request of drawing a picture on the lawn in a garden LD will be described with reference to FIGS. 1 to 4 and using FIGS. 5 to 16.

Figure 5:
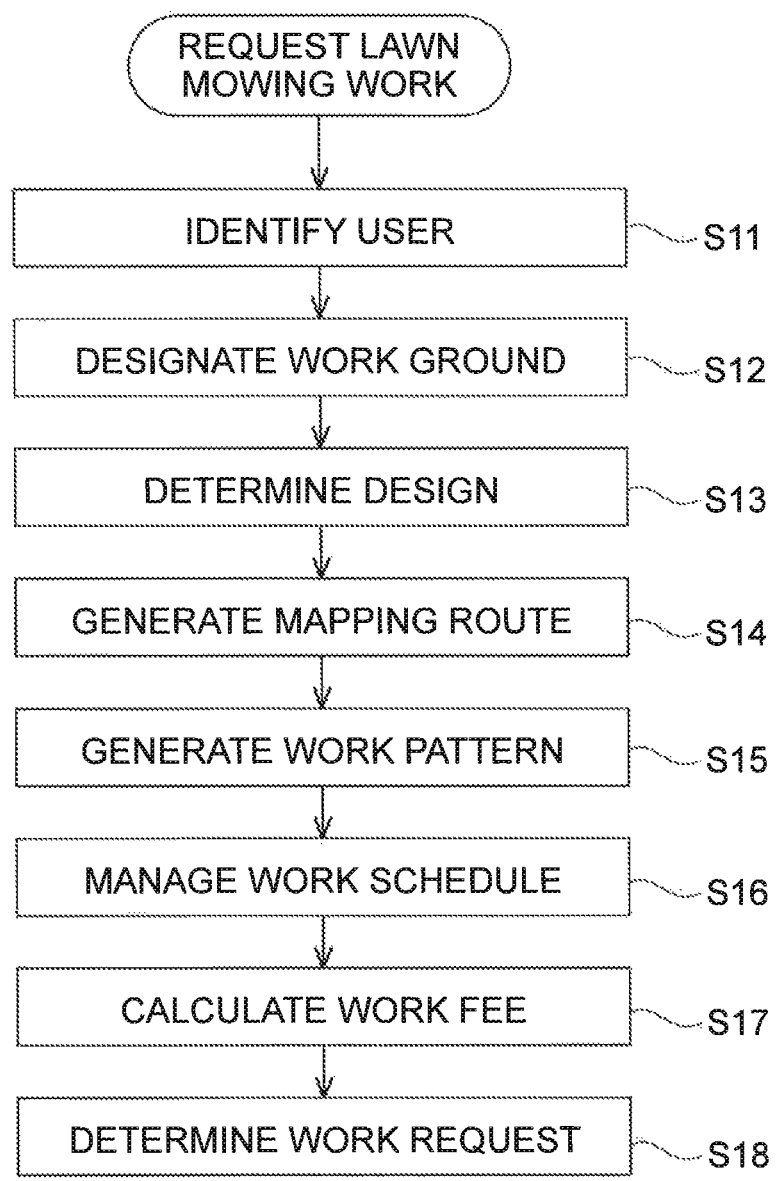
FIG. 5 is a flowchart of a lawn mowing work request by the autonomous travel work system.

FIG. 5 shows a flowchart of a work request of lawn mowing, and FIGS. 6 to 16 show an example of a screen to input request information to the system.

A user of the autonomous travel work system 1 accesses the computer 100 through the network 160 using the information terminal 140. The screen data to input necessary information to request a work is transmitted through the network 160, the input screen is displayed on the display means 144 of the information terminal 140. In accordance with the displayed instructions on the screen, the user inputs the necessary information to request the work. The input order can be appropriately changed.

First, the user of the autonomous travel work system 1 is identified (S11). When user information has not been registered beforehand, user information to identify the user, such as a user's name and address, a credit card number and expiration date thereof for settlement, is input.

Figure 6:
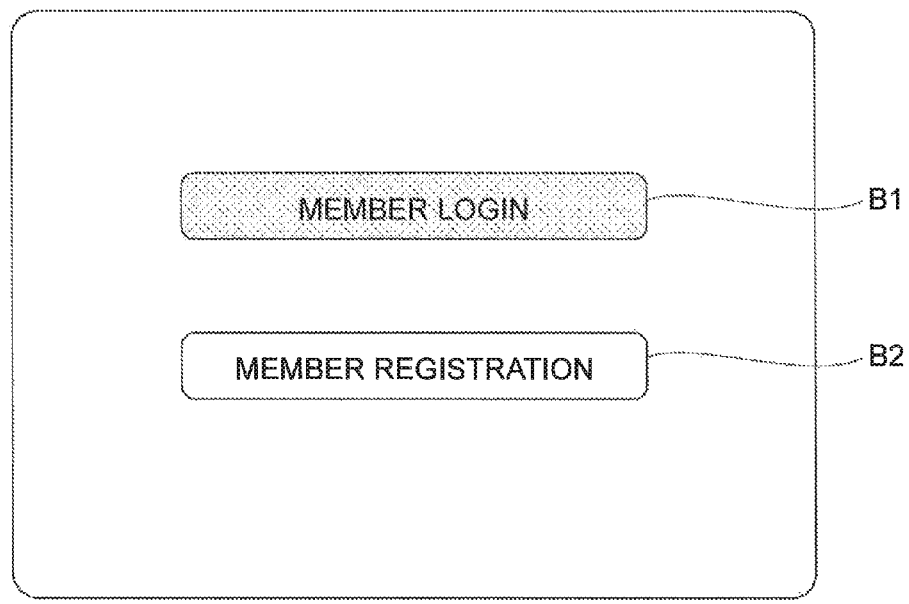
FIG. 6 is an example of a screen to input request information to the system.

For example, in FIG. 6 showing an example of an input screen, by selecting a button B2 (member registration), the screen moves to an input screen which is not shown in the drawings, the user information is input. The input user information is stored in the storage means 103 of the computer 100. A user ID and a password related to the user information are generated by the user identification means 105 of the computer 100 and stored in the storage means 103 of the computer 100. The generated user ID and password are transmitted to the information terminal 140 and displayed on the display means 144 of the information terminal 140.

Figure 7:
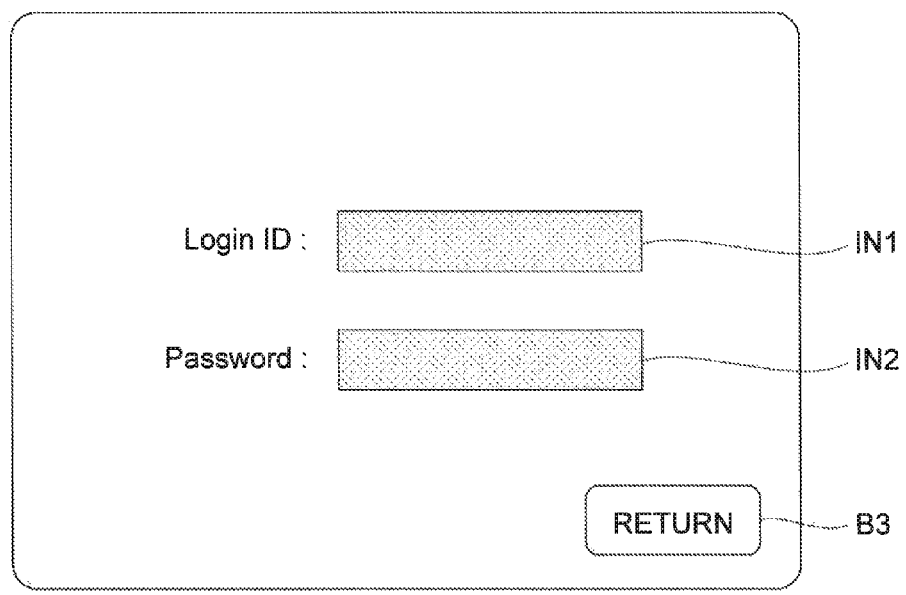
FIG. 7 is an example of a screen to input request information to the system.

When the user information has been registered beforehand, on the input screen shown in FIG. 6, by selecting a button B1 (member login), the screen moves to the input screen shown in FIG. 7 and the user ID and the password are input in input fields IN1 and IN2, respectively. The user is identified by the input user ID and password. On this screen, by selecting a button B3 (return), the screen moves to the previous input screen. The input screens which will be described later may appropriately include the button B3 (return). It is only required to identify the user of the autonomous travel work system 1, and the method for identifying the user is not limited to the above described method.

Next, the garden LD as the work ground where the lawn is mowed is designated (S12). A border of the garden LD is input, and based on map information having location information including the garden LD and the input border of the garden LD, the location information about the border is determined.

Figure 8:
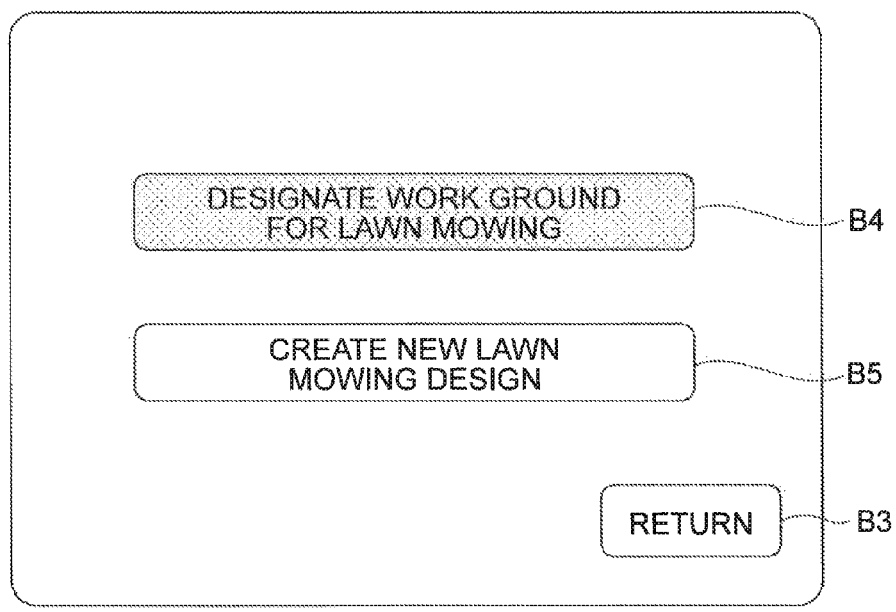
FIG. 8 is an example of a screen to input request information to the system.

When the user is identified, the screen moves to the input screen shown in FIG. 8. By selecting a button B4 (designate work ground for lawn mowing), the screen moves to the input screen shown in FIG. 9. The input screen shown in FIG. 8 may include a button B5 (create new lawn mowing design) by selecting which the screen moves to the input screen to create a new lawn mowing design, which will be described later.

Figure 9:
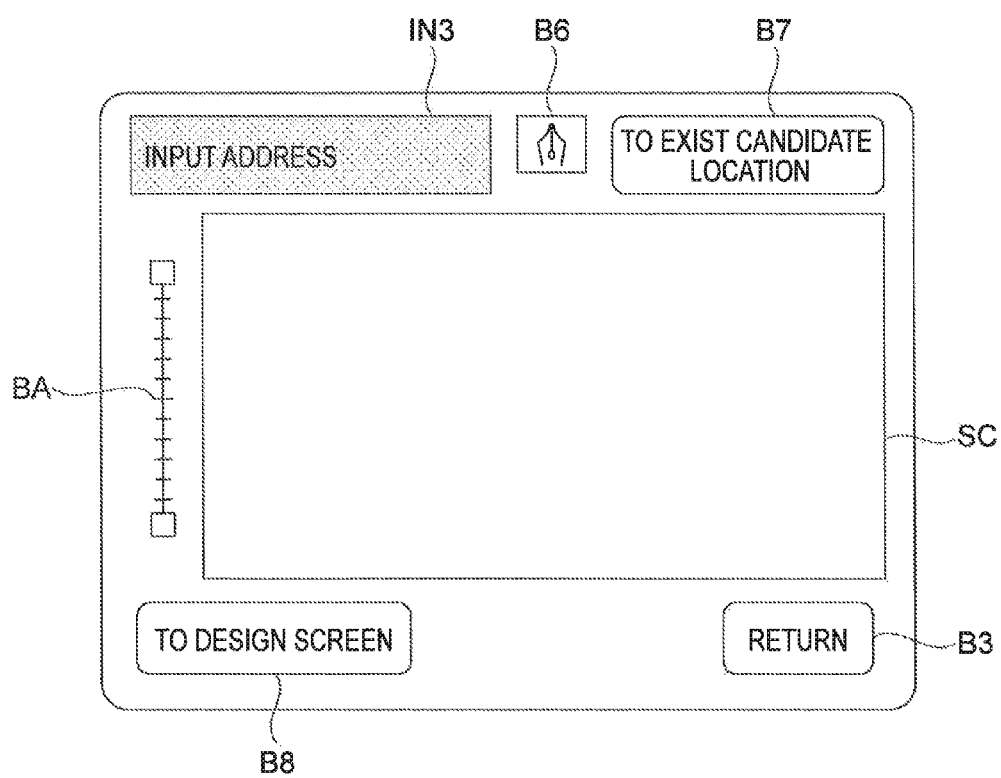
FIG. 9 is an example of a screen to input request information to the system.
Figure 10:
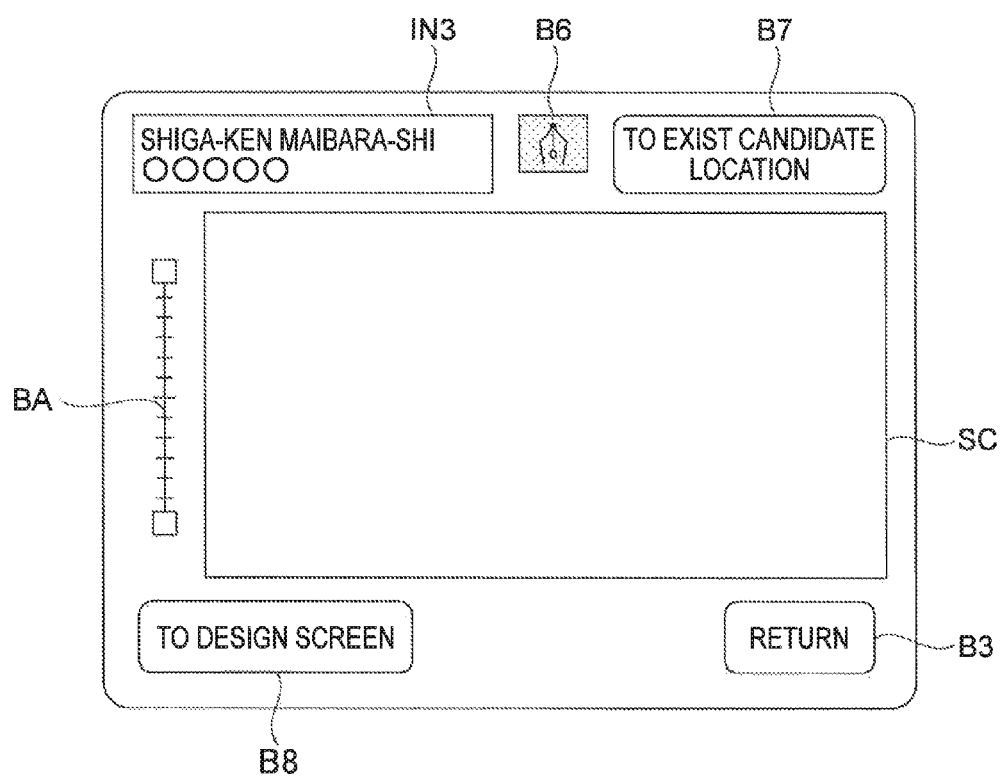
FIG. 10 is an example of a screen to input request information to the system.

On the input screen shown in FIG. 9, when the address or a neighborhood address of the garden LD as the work ground is input in a input field IN3, as shown in the input screen of FIG. 10, a map image around the input address based on the map information stored in the storage means 103 of the computer 100 is displayed on SC. The map image may be an aerial photograph image and is not particularly limited. The map image is map information having geographical location information, such as latitude and longitude of a location on the map image. The input screen includes a button BA to enlarge/reduce the displayed map image and may be able to display the map image being rotated.

Next, the border designating the area of the garden LD as the work ground is input. By selecting a button B6, as shown in the input screen of FIG. 11, the border designating the area of the garden LD is input on the map image displayed on SC. By the work ground designation means 106 of the computer 100, based on the map information having the location information including the garden LD and the input border of the garden LD, the location information about the border is generated and stored in the storage means 103 of the computer 100. It is only required to designate the garden LD as the work ground for lawn mowing and the method for inputting the border is not limited to the above described method.

The garden LD as the work ground may be designated by selecting one of a plurality of existing work grounds (location information on the borders of the work grounds) stored in the storage means 103 of the computer 100. For example, on the input screen shown in FIG. 9, by selecting a button B7 (to exist candidate location), the screen moves to the screen (not shown) on which thumbnail images of the work grounds stored in the storage means 103 of the computer 100 are displayed and by selecting one of the displayed work grounds, the work ground may be designated. It is only required to designate the garden LD as the work ground for lawn mowing, and the method for designating the work ground is not limited to the above described method.

Next, a design of mowing the lawn in the garden LD (lawn mowing design) is determined (S13). To determine the lawn mowing design, there are three methods as follows and any one of the methods may be used. (1) Selecting one of a plurality of existing design data stored in the storage means 103 of the computer 100. (2) Creating design data from a design which a worker oneself draws with the information terminal 140. (3) Processing/Creating a design by importing an image data of a photograph, a picture, and the like.

Figure 11:
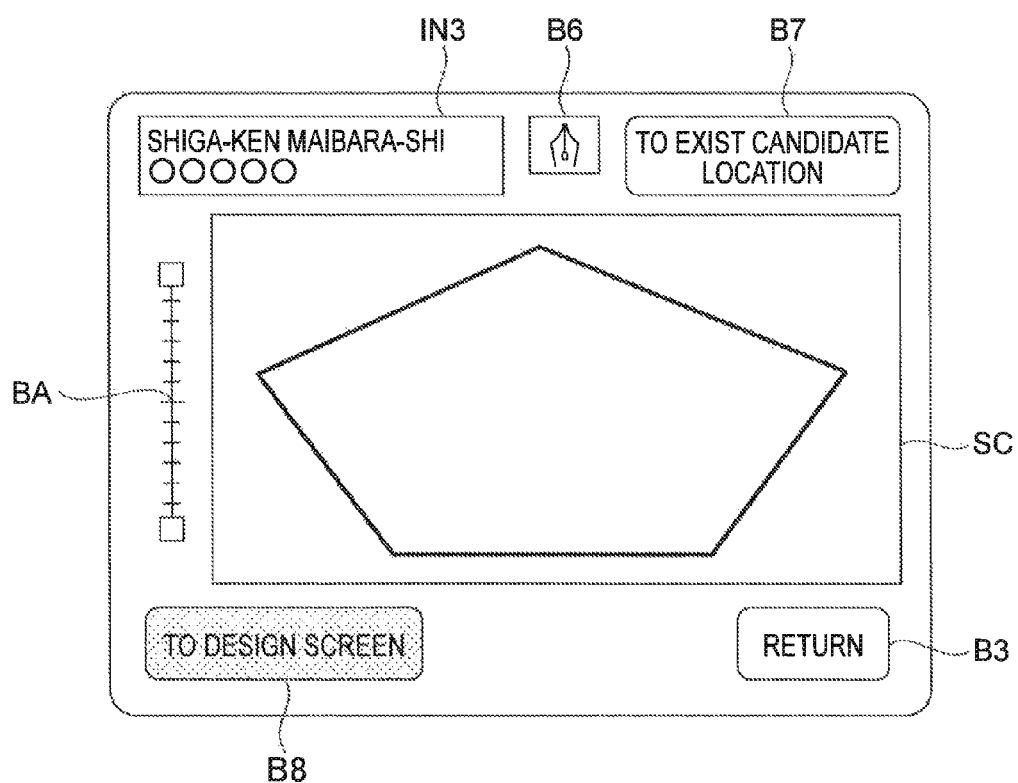
FIG. 11 is an example of a screen to input request information to the system.
Figure 12:
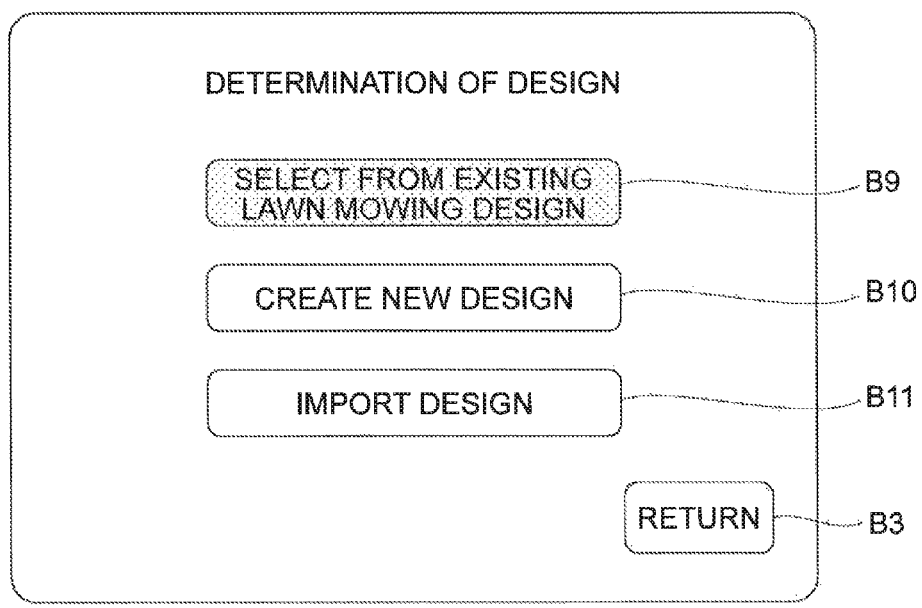
FIG. 12 is an example of a screen to input request information to the system.
Figure 13:
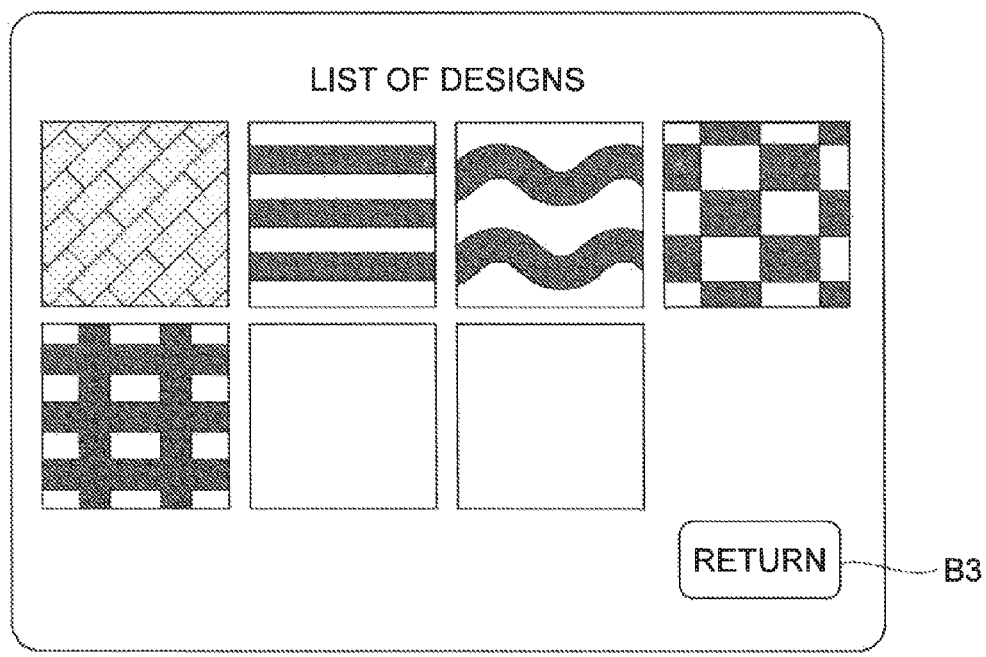
FIG. 13 is an example of a screen to input request information to the system.
Figure 14:
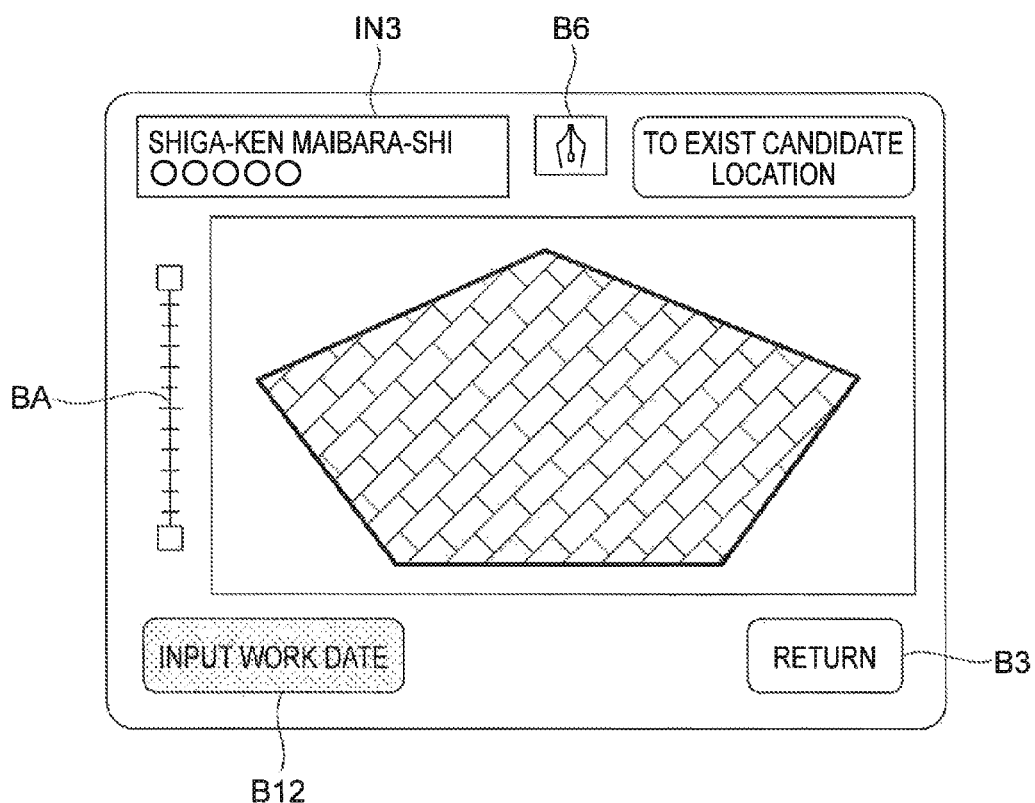
FIG. 14 is an example of a screen to input request information to the system.

In the method (1), on the input screen shown in FIG. 11, by selecting a button B8 (to design screen), the screen moves to the screen to select the method for determining a design as shown in FIG. 12. By selecting a button B9 (select from existing lawn mowing design), as shown in the input screen of FIG. 13, thumbnails images of a plurality of design data stored in the storage means 103 of the computer 100 are displayed. By selecting one of the displayed plurality of design data, the design allocation means 107 of the computer 100 allocates the selected design data to the map image of the work ground, and the allocated image is displayed on SC as shown in FIG. 14.

In the method (2), on the input screen shown in FIG. 12, by selecting a button B10 (create new design), the screen moves to the input screen (not shown) on which the design formation means 147 is operated. Using the design formation means 147, the user oneself freely draws a diagram, creates design data, transmits the data to the computer 100, and stores the data in the storage means 103 of the computer 100. In this case, the input line may be corrected to be a straight line or a curved line by existing correction means. The design may be created on the displayed map image including the garden LD and the user can create a design checking how the lawn is mowed based on the created design.

In the method (3), on the input screen shown in FIG. 12, by selecting a button B11 (import design), the screen moves to the screen (not shown) to import the design data, and the image data (design data), such as a photograph and a picture, is stored in the storage means 103 of the computer 100. Then, similar to (1), by selecting a button B8 (select from existing designs), the screen moves to the screen on which thumbnail images of the plurality of design data stored in the storage means 103 of the computer 100 are displayed. By selecting one of the displayed plurality of design data, the design allocation means 107 of the computer 100 allocates the selected design data to the map image of the work ground and the allocated image is displayed on SC.

In any methods, the design allocation means 107 allocates the design data to the map image of the work ground, and further generates the location information about the diagram included in the design and the contrast information about the diagram of the design on the location. The generated information is stored in the storage means 103 the computer 100.

In any methods for determining the design, the design data to be allocated may be allocated after the processes of enlargement, reduction, rotation, correction of contrast, and the like.

Although, the designs are constrained (line width and contrast of the design expressed by the height of the mowed lawn) due to the capability of the electric lawn mower 10, in any methods for determining a design, the selected design may be changed to the design based on the constraints of the electric lawn mower 10 by the design allocation means 107 of the computer 100. Therefore, the user does not need to confirm whether the lawn can be mowed with the selected design, can grasp how the lawn is mowed based on the selected design before the request, and according to which, can decide or change the design.

The method for determining a lawn mowing design is not limited to the above described method. For example, the computer 100 may include design extraction means which is not shown, the design extraction means extracts some recommended designs suitable for a shape of the garden LD and the like from the plurality of design data stored in the storage means 103 of the computer 100 and displays the extracted designs as thumbnails. Then, similar to (1), by selecting one of the displayed plurality of design data, the design may be determined. The design extraction means assists the system user in creating a design and it is possible to reduce the system user's labor for creating a design.

Next, in order to generate topographic map information (mapping) including detail ground shapes (topographic information) of the garden LD, a moving route (mapping route) of the electric lawn mower 10 is generated (S14). The mapping route is generated by the mapping route generation means 108 of the computer 100 and stored in the storage means 103. The mapping route is generated based on the map information stored in the storage means 103 of the computer 100 and the location information about the border of the garden LD, but the method for generating the route is not particularly limited. When the entire of the garden LD can be mapped by the route, the method is not particularly limited. The route is, for example, when the electric lawn mower 10 travels in the garden LD at approximately 2 m intervals.

Next, for mowing the lawn, a work pattern, such as a moving route of the electric lawn mower 10, a location for lawn mowing, the height of the mowed lawn on the location, is generated (S15). The work pattern is generated by the work pattern generation means 109 of the computer 100. The work pattern is generated based on the map information stored in the storage means 103 of the computer 100, the location information about the border of the garden LD, the location information about the diagram included in the allocated design to the garden LD, and the contrast information about the diagram of the design on the location. The method for generating the pattern is not particularly limited.

Next, a schedule of a lawn mowing work is managed (S16). Whether the lawn mowing is performed or not according to the user's desired date and time for the lawn mowing is determined and the lawn mowing is scheduled. In the schedule management, it is only required to determine the date and time for performing the lawn mowing. The date and time on which the lawn mowing can be performed may be proposed to the user and the user may select from the proposed date and time. The method for managing the schedule is not particularly limited.

Figure 15:
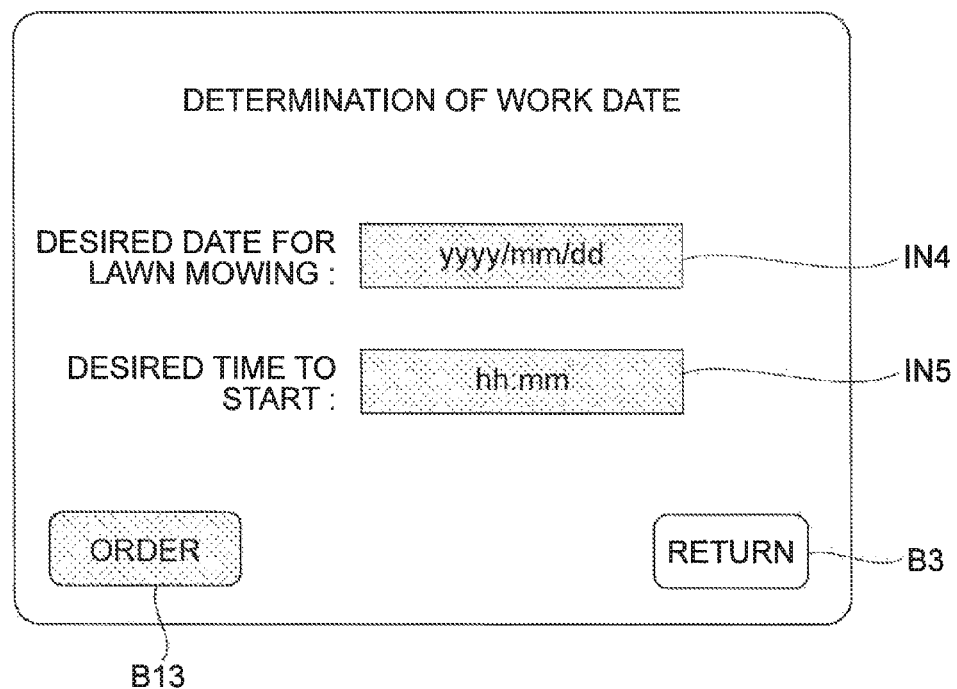
FIG. 15 is an example of a screen to input request information to the system.

After the design is determined, on the input screen shown in FIG. 14, by selecting a button B12 (input work date), the screen moves to the input screen to input the work date as shown in FIG. 15. By inputting the desired date and desired time for lawn mowing in input fields IN4 and IN5, respectively, the schedule management means 111 of the computer 100 determines whether the lawn mowing can be performed on the desired date and time or not. The schedule management means 111 of the computer 100 determines whether the lawn mowing can be performed based on the desired date and time for the work, the work pattern, and the like. When the lawn mowing can be performed on the desired date and time, the desired date and time are stored in the storage means 103 of the computer 100. When the lawn mowing cannot be performed on the desired date and time, the screen moves to the input screen to input the desired date and time and a notice to input another desired date and time is displayed on the input screen. The method for inputting the desired date and time for the lawn mowing is not particularly limited. For example, dates and times on which the lawn mowing can be performed are displayed as thumbnails and by selecting one of the displayed dates and times, the desired date and time for the lawn mowing may be input.

Figure 16:
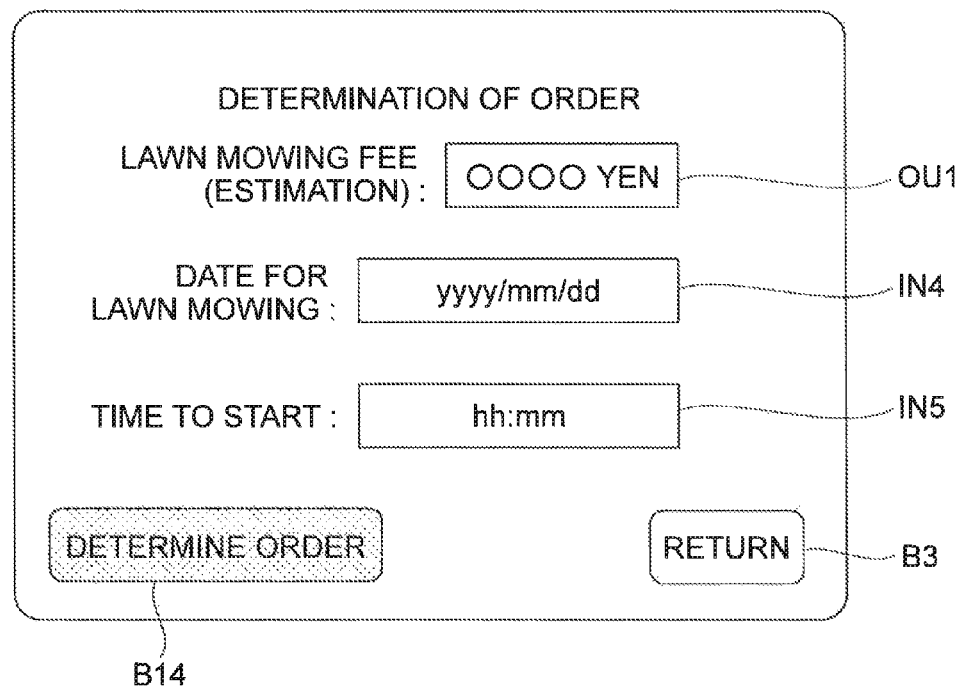
FIG. 16 is an example of a screen to input request information to the system.

Next, work fee is calculated (S17). The work fee calculation means 110 of the computer 100 calculates the work fee based on the place of the garden LD, the work pattern, the desired date and time for the lawn mowing, and the like. The calculated work fee is stored in the storage means 103 of the computer 100 and is displayed in OU1 on the input screen as shown in FIG. 16. The method for calculating the work fee is not particularly limited. For example, the work fee may be calculated based on the size of the garden LD and the traveling route distance of the electric lawn mower 10 when mowing the lawn.

Next, a work request is determined (S18). The work request means 150 of the information terminal 140 determines the work request. It is only required to transmit the determination of the user's intention to request the lawn mowing to the computer 100, the determination of the work request is not particularly limited. On the input screen as shown in FIG. 16, by selecting a button B14 (determine order), the determination of the user's intention to request the work according to the information (e.g., the garden LD, the design, the desired date and time for the lawn mowing) as described above is transmitted to the computer 100, stored in the storage means 103 of the computer 100, and the work request is determined. When the work is requested, the settlement may be performed with user's credit card which has been input, or after confirmation of the settlement with user's input credit card and inputting the user's decision of the settlement, the settlement procedure may be performed by a credit company.

In the above described example, although the information terminal 140 is used for inputting and displaying various works, the information terminal 140 may include the work ground designation means 106 and the design allocation means 107 which are included in the computer 100. Furthermore, the storage means 143 of the information terminal 140 may stores the map information, the design data, and the like.

Figure 17:
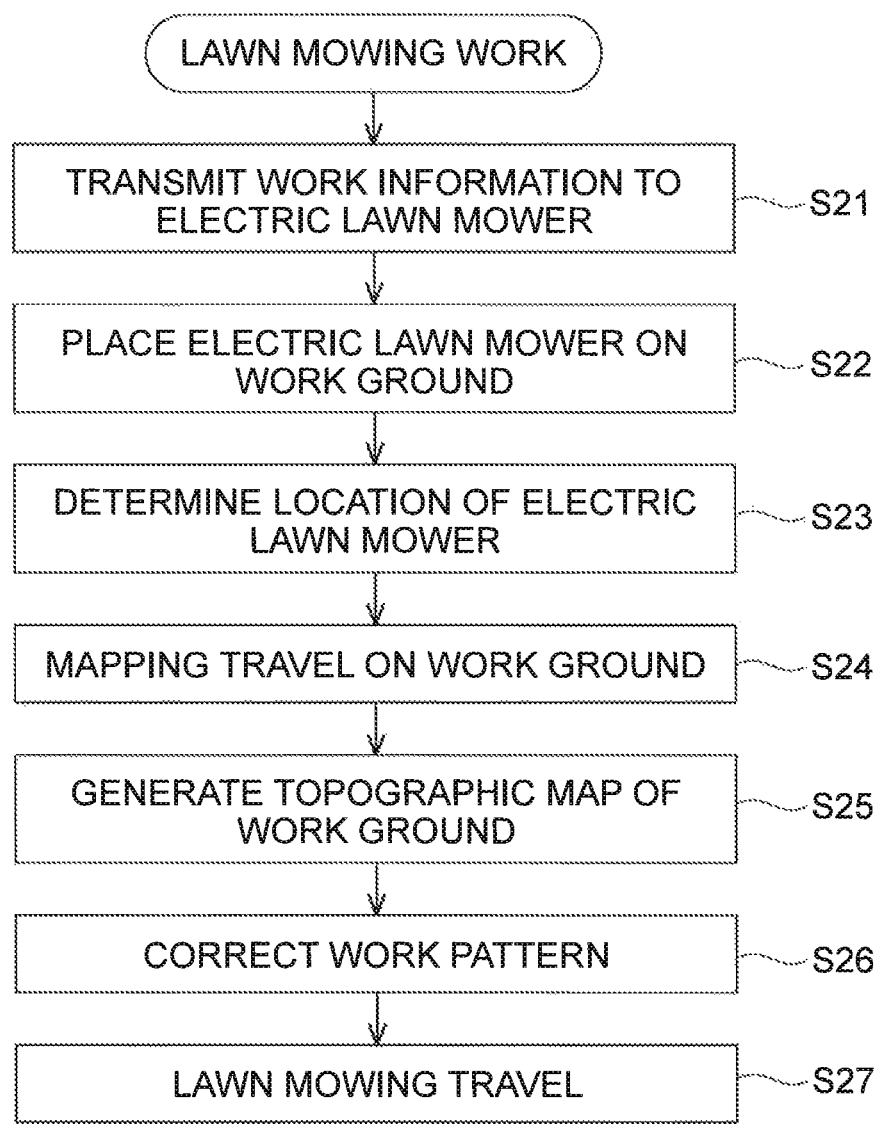
FIG. 17 is a flowchart of a lawn mowing work by the autonomous travel work system.
Figure 18:
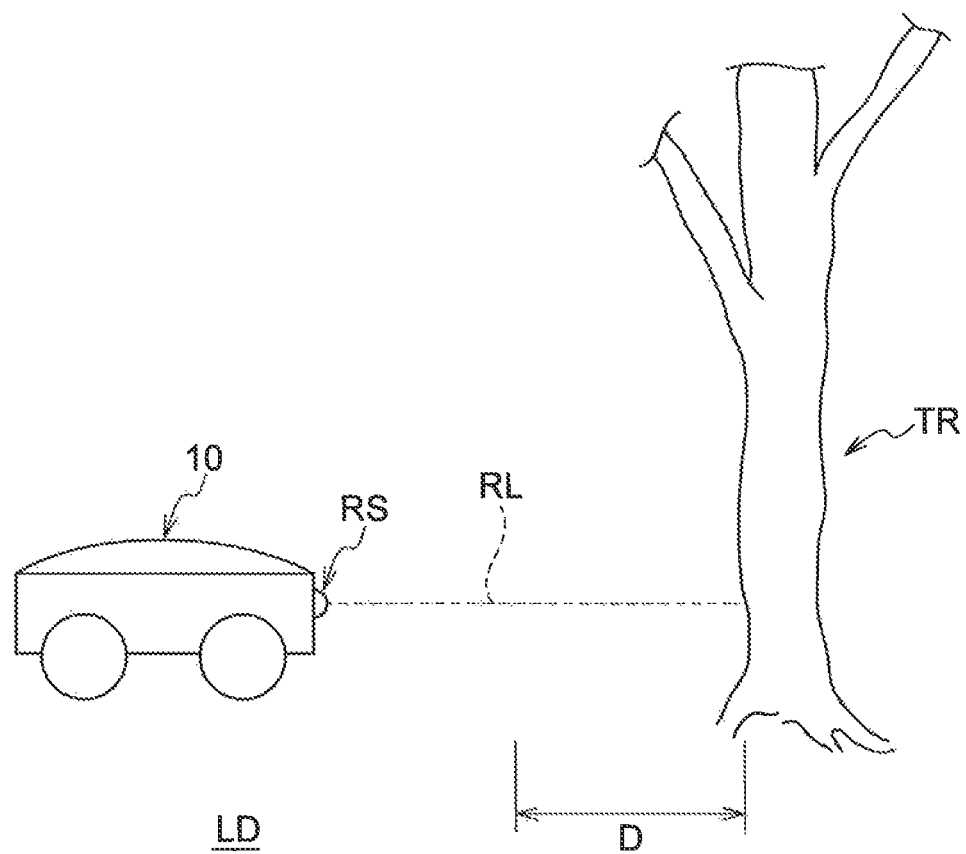
FIG. 18 is a diagram to illustrate an approach distance between a tree and the electric lawn mower.

Next, using the autonomous travel work system 1 with this configuration, a method for drawing a picture on the lawn in the garden LD will be described with reference to FIGS. 1 to 4 and using FIGS. 17 to 19. FIG. 17 shows a flow of the lawn mowing, FIG. 18 is a diagram to illustrate an approach distance between a tree and the electric lawn mower, and FIG. 19 shows the height of the mowed lawn.

First, the map information and the work information is transmitted to the electric lawn mower 10 (S21). The work information, such as a mapping route, a work pattern, is stored in the storage means 17 of the electric lawn mower 10. The electric lawn mower 10 is transferred and placed on the garden LD (S22).

By pressing a mapping start button SW3 included in the electric lawn mower 10, geographical location information about the electric lawn mower 10 is detected by the location detection means DT (S23). More specifically, the GPS reception means SE1 receives the GPS wave signal from the GPS satellite 120, and the location detection means DT detects the geographical location information about the electric lawn mower 10. Then, the electric lawn mower 10 travels tracing the mapping route, and a laser scanner LS reads the shape of the ground (topographical information) (S24). Based on the topographical information read by the laser scanner LS and the location information about the border of the garden LD which has been stored in the storage means 17 of the electric lawn mower 10, the topographic map information are generated by the topographic map generation means 18 of the electric lawn mower 10 and stored in the storage means 17 (S25).

Next, based on the map information which has been stored in the storage means 17 of the electric lawn mower 10 and the topographic map information generated by mapping, the work pattern which has been stored in the storage means 103 of the electric lawn mower 10 is corrected by the work pattern correction means 19 of the electric lawn mower 10 (S26).

Next, lawn mowing travel is started according to the corrected work pattern (S27). To start lawn mowing travel, a lawn mowing travel start button 159 is pressed. The electric lawn mower 10 starts the lawn mowing travel. The current location and the traveling direction of the electric lawn mower 10 is appropriately corrected based on travel information (e.g., the location information by the GPS satellite 120, the traveling speed, the traveling direction, and the like). Based on the current location and the traveling direction of the electric lawn mower 10 and the corrected work pattern, the lawn mowing travel (e.g., the traveling speed, the traveling direction, the height of the mower deck, the rotation speed of the mower blade, and the like) is controlled by the control means 11.

As described above, the lawn mowing is performed according to the desired design on the garden LD. When unexpected dangers, such as an obstacle, are caused during the lawn mowing travel, by an emergency stop button of the remote operation means 113 of the computer 100, the electric lawn mower 10 can be emergently stopped.

As shown in FIG. 18, when there is an obstacle, such as a tree TR, in the garden LD, during traveling to map the garden LD, the electric lawn mower 10 needs to avoid the tree TR so as not to collide. In this example, an infrared ray sensor RS provided on a front part of the electric lawn mower 10 projects infrared ray RL forward and detects the reflected infrared ray RL. The infrared ray sensor RS thereby detects the tree TR on the front in the traveling direction of the electric lawn mower 10. The detection information by the infrared ray sensor RS is transmitted to the control means 11 included in the electric lawn mower 10. The detection information is, for example, width of the tree TR, the distance between the electric lawn mower 10 and the tree TR.

The control means 11 avoids to travel within a certain distance D from the tree TR by changing the traveling direction and the traveling speed of the electric lawn mower 10 based on the detection information. The location information within a certain distance D from the tree TR is added as a travel avoidance area to the topographic map information generated by mapping, when the work pattern correction means 19 corrects the work pattern, the route may be changed so as not to travel in the travel avoidance area.

As shown in FIG. 19, average height H of a lawn LW from a ground G is set in advance, and a spot where the lawn LW is mowed height h2 higher with respect to the average height H, or a spot where the lawn LW is mowed height h1 lower with respect to a virtual mowed surface AP can be set. With the setting, unevenness of the lawn LW formed on the garden LD is more distinct, it is possible to form a clearer design. These controls are performed the control means 11 of the electric lawn mower 10.

The work monitoring means 112 of the computer 100 monitors the current location, the traveling direction, the traveling speed, the traveling direction, the height of the mower deck, the rotation speed of the mower blade, and the like of the electric lawn mower 10. When the electric lawn mower 10 includes a camera to capture a surrounding situation, the work situation may be monitored with the video captured by the camera. Accordingly, the work situation of the electric lawn mower 10 can be monitored with the computer 100 placed away from the garden LD.

In the above described example, the electric lawn mower 10 independently maps the garden LD, generates the topographic map of the garden LD, travels mowing the lawn based on the transmitted map information and the work information (the mapping route, the work pattern, and the like), but various movements may be performed in conjunction with the computer 100. For example, the computer 100 may include the topographic map generation means 18, the geographical information read by the laser scanner LS of the electric lawn mower 10 is appropriately transmitted to the computer 100, and the topographic map information may be generated by the computer 100. Furthermore, the computer 100 may include the work pattern correction means 19 to correct the work pattern, and correct the work pattern based on the map information and the topographic map information by mapping. In addition, the travel information (the location information by the GPS satellite 120, the traveling speed, the traveling direction, and the like) of the electric lawn mower 10 during the lawn mowing travel is appropriately transmitted to the computer 100, and the computer 100 may control the lawn mowing travel of the electric lawn mower 10.

In the above described example, one of the electric lawn mower 10 performs the lawn mowing work, but a plurality of electric lawn mower 10 may perform the lawn mowing work. By the cooperation and collaboration of the electric lawn mowers 10, it is possible to divide a lawn mowing area or work procedures, and the lawn mowing work hours can be shortened. It is beneficial especially in a large work ground.

Furthermore, the autonomous travel work system 1 may include a charging station to charge a battery which is not shown in the drawings as a power source of the electric lawn mower 10. With this configuration, the electric lawn mower 10 can autonomously return to the charging station and charge the battery based on the residual electric power of the battery. After the battery is charged, the electric lawn mower 10 can resume the lawn mowing work. Therefore, it is possible to perform the lawn mowing work without worrying about the residual electric power of the battery and it is not required to be monitored near the work ground to charge the battery and perform the charging work.

In the above described examples, the computer 100 includes the work ground designation means 106, the design allocation means 107, the design extraction means, the mapping route generation means 108, the work pattern generation means 109, and the work fee calculation means 110. However, the above means is only necessary to be included in computer 100 or a mobile terminal 140, not particularly limited. When the mobile terminal 140 includes the above means, the storage means 103 of the computer 100 or the storage means 143 of the mobile terminal 140 stores various types of data (the map information, the design data, and the like) and appropriately using these data, performs determination of the work ground, allocation of the design, extraction of the design, generation of the mapping route, generation of the work pattern, and calculation the work fee.

In the example, the electric lawn mower 10 is used as a work vehicle, but it is not limited to this. An engine driven lawn mower may be applicable.

Furthermore, the invention is not limited to the above described embodiments, and various embodiments can be made without departing from the spirit of the invention.

INDUSTRIAL APPLICABILITY

The autonomous travel work system of the invention is not limited to the lawn mowing work, and is applicable to various autonomous travel work systems which perform a work, such as drawing an image or a letter on the ground or on ice of a skate link, according to a work pattern formed based on an image and/or a letter regarding a work ground as a canvas.

REFERENCE SIGNS LIST 1 autonomous travel work system
10 electric lawn mower (work vehicle)
100 computer
103 storage means
105 user identification means
106 work ground designation means
107 design allocation means
108 mapping route generation means (work information generation means)
109 work pattern generation means (work information generation means)
110 work fee calculation means
111 schedule management means
112 work monitoring means
120 GPS satellite
140 information terminal
143 storage means
144 display means
145 user information input means
146 work ground input means
147 design formation means
148 design allocation input means
149 desired date/time input means
150 work request means
160 network
LD garden (work ground)

The invention claimed is:

1. An autonomous travel work system which works, regarding a work ground as a canvas and applying an arbitrary design to the work ground, according to the design, the system comprising:
    an information terminal configured to be input means and transmit input information;
    a computer configured to receive the input information; and
    at least one work vehicle configured to work autonomously traveling in the work ground, wherein
    the information terminal includes:
        display means for displaying a map image including the work ground;
        work ground input means for inputting the work ground on the map image displayed on the display unit;
        design allocation input means for inputting the arbitrary design to be allocated to the work ground; and
        work request means for requesting a work,
    the information terminal or the computer includes:
        work ground designation means for generating location information about the work ground based on the work ground input on the map image;
        design allocation means for allocating the input design to the work ground and generating location information about the design and contrast information about the design; and
        work information generation means for generating geographical information about the work ground designated on the map image and the input design as work information.

2. The autonomous travel work system according to claim 1, wherein the information terminal includes design generation means for creating the design.

3. The autonomous travel work system according to claim 1, wherein
    the information terminal or the computer includes the work fee calculation means for calculating a work fee estimation based on the work information,
    the information terminal includes desired date/time input means for inputting a desired date and time for the work, and
    the computer includes schedule management means for managing a schedule of the work based on the desired date and time.

4. The autonomous travel work system according to claim 1, wherein the design allocation means sets the design based on constraint conditions on that the work vehicle is able to work.

5. The autonomous travel work system according to claim 1, wherein the information terminal or the computer includes design extracting means for extracting a recommended design suitable for a shape of the work ground from existing designs.

6. The autonomous travel work system according to claim 1, wherein
    the information terminal or the computer includes storage means for storing the work information, and
    the work request means included in the information terminal requests the work based on the work information.

7. The autonomous travel work system according to claim 1, wherein the work request means performs settlement of the work fee when the work is requested.

8. The autonomous travel work system according to claim 1, wherein the computer is movable.

9. The autonomous travel work system according to claim 1, wherein the work is a grass mowing work.

10. The autonomous travel work system according to claim 1, wherein the work vehicle electrically travels and works.

11. The autonomous travel work system according to claim 2, wherein
    the information terminal or the computer includes the work fee calculation means for calculating a work fee estimation based on the work information,
    the information terminal includes desired date/time input means for inputting a desired date and time for the work, and
    the computer includes schedule management means for managing a schedule of the work based on the desired date and time.

12. The autonomous travel work system according to claim 2, wherein the design allocation means sets the design based on constraint conditions on that the work vehicle is able to work.

13. The autonomous travel work system according to claim 3, wherein the design allocation means sets the design based on constraint conditions on that the work vehicle is able to work.

14. The autonomous travel work system according to claim 2, wherein the information terminal or the computer includes design extracting means for extracting a recommended design suitable for a shape of the work ground from existing designs.

15. The autonomous travel work system according to claim 3, wherein the information terminal or the computer includes design extracting means for extracting a recommended design suitable for a shape of the work ground from existing designs.

16. The autonomous travel work system according to claim 4, wherein the information terminal or the computer includes design extracting means for extracting a recommended design suitable for a shape of the work ground from existing designs.

17. The autonomous travel work system according to claim 2, wherein
the information terminal or the computer includes storage means for storing the work information, and
the work request means included in the information terminal requests the work based on the work information.

18. The autonomous travel work system according to claim 3, wherein
the information terminal or the computer includes storage means for storing the work information, and
the work request means included in the information terminal requests the work based on the work information.

19. The autonomous travel work system according to claim 4, wherein
the information terminal or the computer includes storage means for storing the work information, and
the work request means included in the information terminal requests the work based on the work information.

20. The autonomous travel work system according to claim 5, wherein
the information terminal or the computer includes storage means for storing the work information, and
the work request means included in the information terminal requests the work based on the work information.

* * * * *